(12) United States Patent
Cummins et al.

(10) Patent No.: US 6,241,332 B1
(45) Date of Patent: *Jun. 5, 2001

(54) IDENTIFICATION CARD PRINTER

(75) Inventors: Robert P. Cummins, Bloomington; Darren W. Haas, Hopkins; Erick Hagstrom, Hamel; Matthew K. Dunham, Eagan; Bradley A. Paulson, Northfield, all of MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/421,711

(22) Filed: Oct. 20, 1999

Related U.S. Application Data

(62) Division of application No. 08/857,520, filed on May 16, 1997.

(51) Int. Cl.[7] ................................. B41J 3/00; B41J 2/01
(52) U.S. Cl. ................................................ 347/4; 347/104
(58) Field of Search ........................................ 347/4, 105

(56) References Cited

U.S. PATENT DOCUMENTS

| | | |
|---|---|---|
| 3,889,472 | 6/1975 | Guillaud . |
| 3,960,072 | 6/1976 | Ahlgren et al. . |
| 4,068,028 | 1/1978 | Samonides . |
| 4,146,900 | 3/1979 | Arnold . |
| 4,393,386 | 7/1983 | Di Giulio . |
| 4,534,313 | 8/1985 | Louvel . |
| 4,604,631 | 8/1986 | Jinnai et al. . |
| 4,680,596 | 7/1987 | Logan . |
| 4,685,702 | 8/1987 | Kazuharu . |
| 4,686,540 | 8/1987 | Leslie et al. . |
| 4,716,346 | 12/1987 | Matsuo . |
| 4,734,868 | 3/1988 | DeLacy . |
| 4,781,985 | 11/1988 | Desjarlais . |
| 5,161,233 | 11/1992 | Matsuo et al. . |
| 5,277,501 | 1/1994 | Tanaka et al. . |
| 5,466,319 | 11/1995 | Zager et al. . |
| 5,478,157 | 12/1995 | Kohno et al. ................... 400/120.02 |
| 5,516,218 | 5/1996 | Amano et al. . |
| 5,646,388 | 7/1997 | D'Entremont et al. . |
| 5,882,127 | * 3/1999 | Amano ................................ 400/421 |

FOREIGN PATENT DOCUMENTS

| | | |
|---|---|---|
| 25 35 699 A1 | 3/1977 | (DE) . |
| 2 120 821 | 12/1983 | (GB) . |
| 04307273 | 10/1992 | (JP) . |
| WO 95/09084 | 4/1995 | (WO) . |

* cited by examiner

Primary Examiner—Thinh Nguyen
(74) Attorney, Agent, or Firm—Westman, Champlin & Kelly, P.A.

(57) ABSTRACT

Information is printed onto an identification card using an ink jet printer. The ink jet printer includes a tray which moves the card in a first direction and a print head which moves relative to the card in a second direction. An ink receiving surface may be deposited onto the card prior to ink jet printing. A magnetic recording head is optionally included in the printer whereby information may be magnetically recorded onto the card.

34 Claims, 4 Drawing Sheets

IDENTIFICATION CARD PRINTER

This is a Divisional application of U.S. patent application Ser. No. 08/857,520, filed May 16, 1997.

BACKGROUND OF THE INVENTION

The present invention relates to ink jet printers. More specifically, the invention relates to an ink jet printer for printing onto identification cards.

Identification cards are widely used to carry information relating to the card holder, for example. The use of such identification cards is becoming more and more widespread and they are used for many purposes, such as driver licenses, identification badges, etc. In the past, identification cards have been manufactured using a labor intensive process in which an individual's data was manually stamped or imprinted onto a card. Additionally, in some cases an instant photograph was taken of the subject and adhered or laminated to a card. However, with the advent of computers, manufacturing of identification cards has become increasingly automated. An individual's data may be obtained from a computer database and formatted by the computer. The formatted information is then provided to a special printer for printing onto the identification card. Subsequently, the identification card may be laminated to protect the printed information.

This prior art automated identification card printing technique has worked well for large scale operations which can justify the expense of an expensive identification card printer. Such printers may include, for example, a dye sublimation type printer. For example, the Persona® identification card printer available from Fargo Electronics, Inc. of Eden Prairie, Minn. is an example of one type of dye sublimation identification card printer. Further, for longer wear and security, the printed card may be subsequently laminated.

However, as computer systems have become less expensive, the expense of identification card printers has prevented the use of identification cards from finding even more widespread use, particularly in small operations or in implementations having a limited budget. In such situations, if identification cards are required, an expensive identification card printer must be obtained which is more suitable for large scale operations. If this is not possible, a simple, rudimentary prior art identification card impression device must be obtained. Such a device is very limited in its versatility. Alternatively, the identification card must be written out by hand on cardboard, for example, and placed into a plastic sleeve.

None of these solutions are particularly attractive and have left the small user with only limited identification card printing options. Furthermore, it would also be desirable for large scale users to utilize less expensive identification card printers thereby increasing their cost savings as well.

SUMMARY OF THE INVENTION

The present invention includes an ink jet printer for printing onto an identification card. One aspect of the invention provides a method of printing which includes obtaining an identification card, coating a surface of the identification card with an ink receiving surface, placing the coated identification card into an ink jet printer and printing onto the coated surface of the identification card using the ink jet printer. The ink jet printer may be connected to a computer and may receive information from the computer which is used in printing onto the identification card.

In various embodiments of the present invention, the printer includes a tray or a hopper which loads cards into the printer. A magnetic recording head may also be provided whereby magnetic information is recorded onto a magnetic strip carried on the identification card. In another aspect of the invention, the printer includes smart card encoding circuitry whereby an identification card with electronic circuitry carried thereon is encoded using the same ink jet printer.

DETAILED DESCRIPTION OF THE PREFERRED EMBODIMENTS

The present invention provides a low cost, high quality printer for printing identification cards. In the present invention, an ink jet printer is used to perform the printing function. Ink jet printers are relatively fast, reliable and relatively inexpensive to produce. However, the prior art has largely failed in its attempts to provide an identification card printer with these characteristics. The present invention is well suited for low volume identification card production. However, cost savings can be obtained in high volume installations as well. The printer may be coupled to a computer whereby identification cards are inexpensively produced. Further, the production of such cards can be on an as needed basis in which cards are printed on demand and can be immediately put into use. For example, the printer of the present invention could be used to produce identification badges at a guard desk at the entrance to an industrial facility. Further, in the prior art, most inexpensive identification card printers have required a subsequent laminating step or the cards have been required to be carried in transparent, waterproof pouches. However, in the present invention the printed identification card surface does not require any additional protection and may be directly exposed during normal usage. Further, the identification card dries very rapidly after being printed with an ink jet printer whereby it may be placed immediately into use. This is particularly advantageous, and very difficult to obtain using an ink jet printer due to the aqueous nature of ink jet ink.

Figure 1:
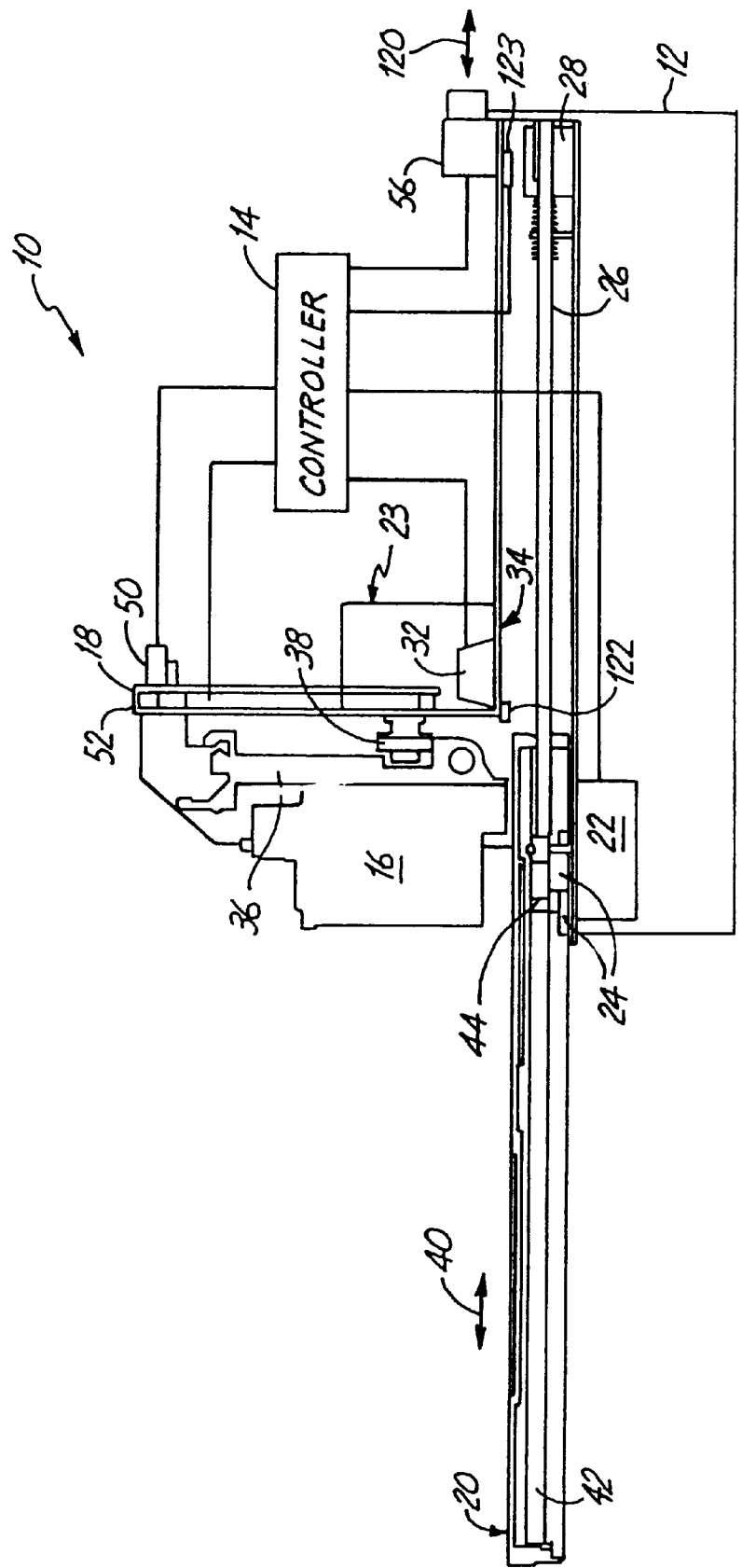
FIG. 1 is a side plan view of an ink jet identification card printer in accordance with one embodiment of the present invention.

FIG. 1 is a side plan view of an ink jet identification card printer 10 in accordance with the present invention. Printer 10 includes base 12 and generally includes controller 14, ink jet print head 16, control panel 18 and tray 20. Tray 20 is coupled to tray drive stepper motor 22 through tray drive gears 24 and tray drive belt 26 which couples to belt tensioner 28. Belt tensioner 28 acts to provide tension to tray drive belt 26 whereby slack in belt 26 is taken up during operation of tray drive gears 24. A magnetic recording head 32 is carried on internal mount 34.

Print head 16 is carried on print head carriage 36 and is coupled to print head drive mechanism 38. Print head 16, print head carriage 36 and a printer controller (not shown in FIG. 1) are available from Lexmark of Lexington, Ky., 740 New Circle Road N.W., Lexington, Ky. 40511-1876 as Model No. 2010 Tray 20 moves horizontally in the direction indicated by arrow 40 along tray slide shaft 42 which is slidably carried in tray slide bearing 44. Control panel 18 includes control buttons 50 and LED's 52 which both couple to controller 14. A computer input/output connection 56 also couples to controller 14. As shown in FIG. 1, controller 14 connects to magnetic head 32 and stepper motor 22.

Figure 2:
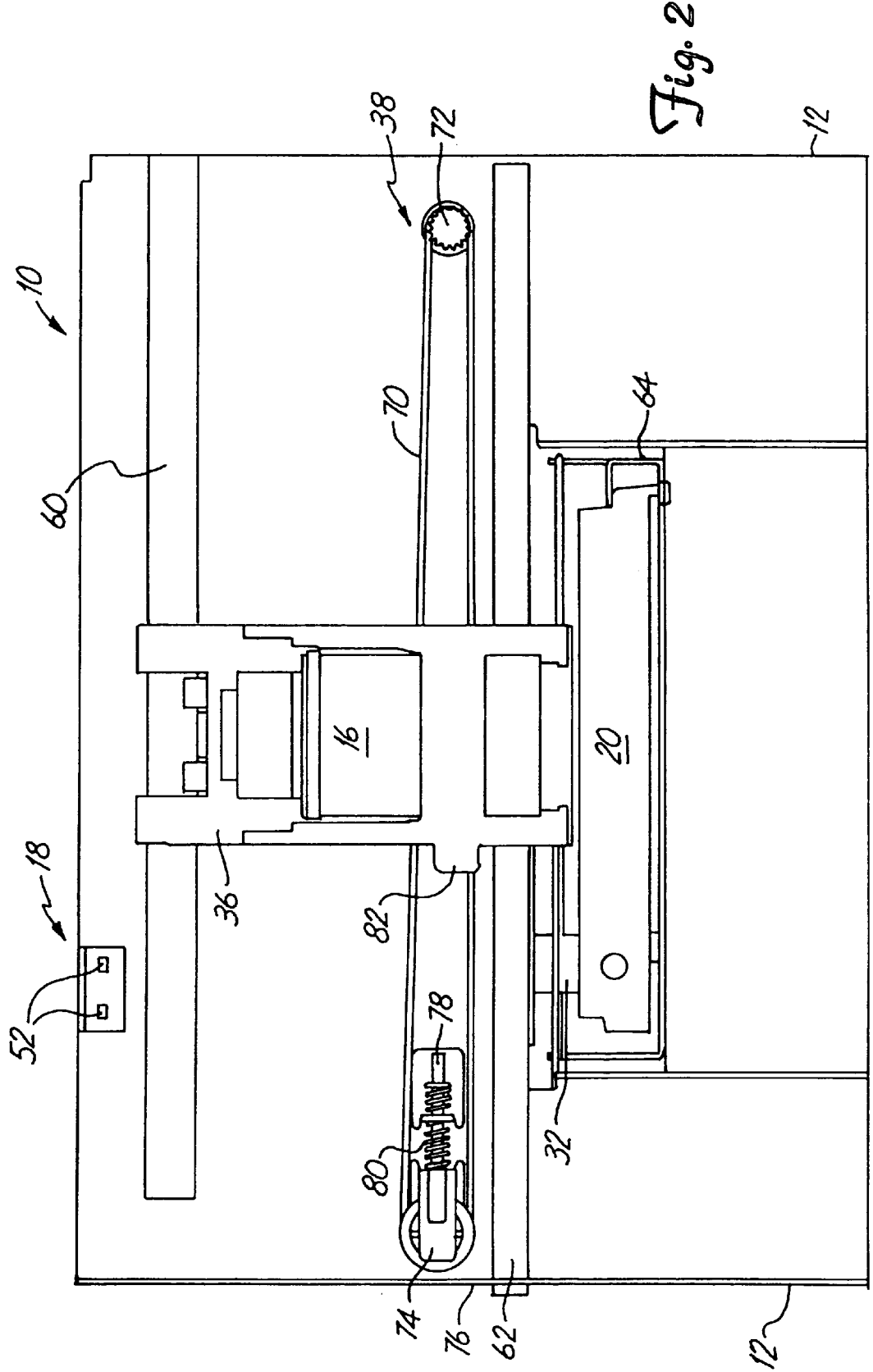
FIG. 2 is a front plan view of the ink jet identification card printer of FIG. 1.

FIG. 2 is a front plan view of the ink jet identification card printer 10 shown in FIG. 1. FIG. 2 shows print head 16 carried on print head carriage 36 which couples to print head carriage guide 60 and print head carriage guide shaft 62. Identification card tray 20 is carried in tray drive frame 64. FIG. 2 also shows print head drive mechanism 38 in greater detail which includes drive belt 70 coupled to drive stepper motor gear 72 and coupled to belt tensioner 74. Tensioner 74 includes shaft 78 which is spring loaded by spring 80. Surface 82 abuts a side wall 76 of base 12 to thereby prevent over-extension of print head carriage 36 during the printing operation.

Figure 3:
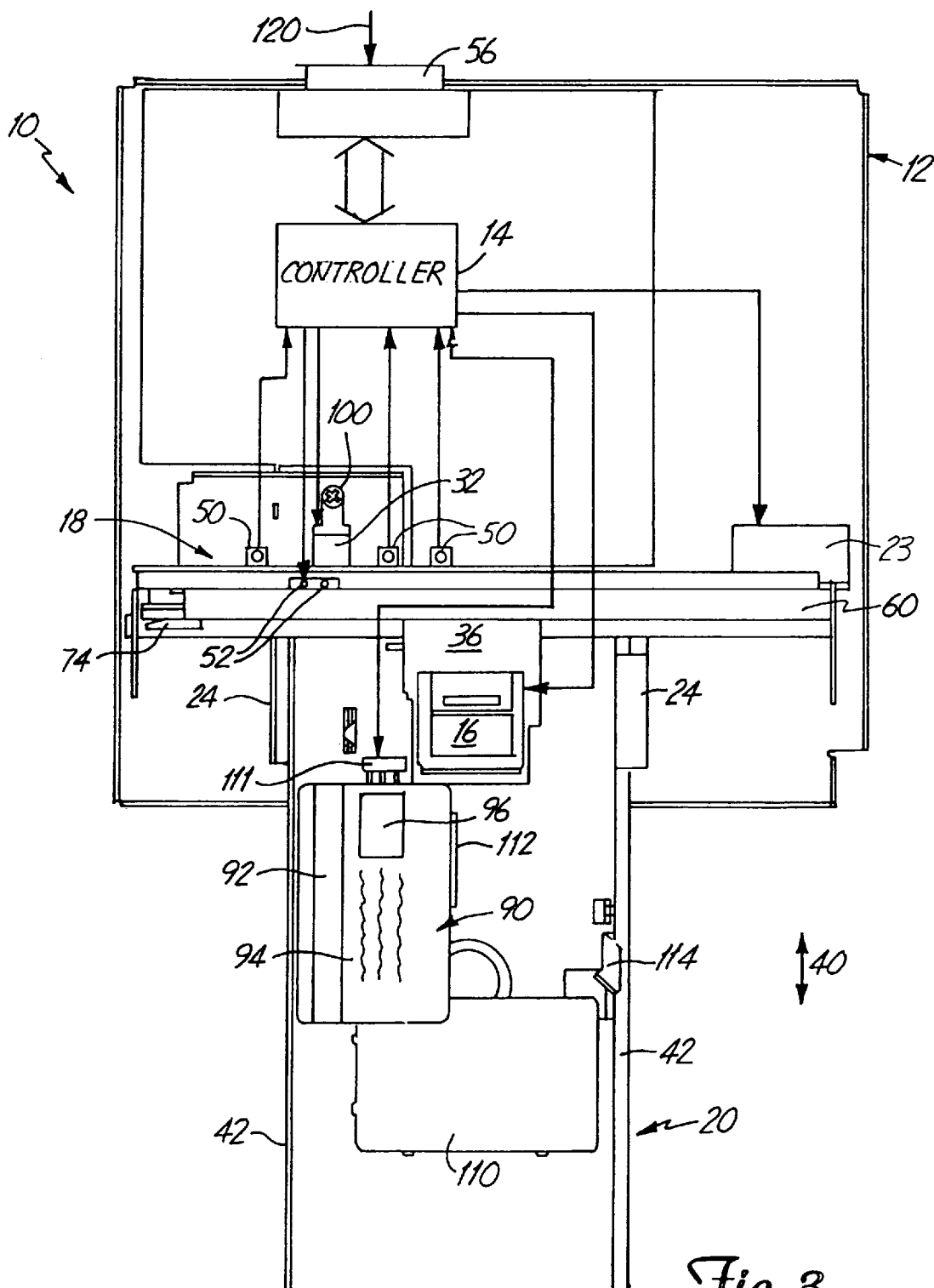
FIG. 3 is a top plan view of the ink jet identification card printer of FIG. 1.

FIG. 3 is a top plan view of ink jet identification card printer 10 of FIG. 1. In FIG. 3, tray 20 is shown in an extended position carrying an identification card 90 which includes a magnetic strip 92 and carries, for example, printed or text information 94 and photographic information 96. As explained below, text information 94 and 96 is printed using ink jet print head 16 and may be placed on any side of card 90 which has the ink receptive surface thereon. Preferably, there is a space between the magnetic strip 92 and the ink receptive surface. FIG. 3 also shows controller 14 which couples to stepper motor 22 and stepper motor 23, LED's 52 and switches 50 (both carried on control panel 18), print head 16 and magnetic recording head 32. A screw 100 couples magnetic head 32 to base 12. FIG. 3 also shows print head drive stepper motor 23 which couples to print head drive belt 70 and is controlled by controller 14. Stepper motor 23 is actuated to transfer movement to print head carriage 36 and print head 16 via belt 70 (shown in FIG. 2).

Turning now to tray 20 in greater detail, as shown in FIG. 3, tray 20 includes identification card holding regions 110 and 112. In FIG. 3, card 90 is shown positioned in holding region 112 which is used during magnetic encoding of information onto magnetic strip 92. Identification card holding region 110 is used during the printing operation when information 94 and 96 is printed onto a surface of card 90. An identification card clip mechanism 114 is positioned adjacent one corner of holding region 110 and is moveable to secure a corner of identification card 90 when positioned in holding region 110. A similar identification card clip mechanism (not shown) is positioned adjacent one corner of identification card holding region 112 for securing clip therein during magnetic recording of information. In one preferred embodiment, holding region 110 is used when printing information 94 and 96 to a top surface of card 90 using in jet print head 16. Similarly, identification card holding region 112 is used to hold identification card 90 for writing magnetic encoded information onto magnetic strip 92 using magnetic head 32. As will be explained more fully below, tray 20 is moveable along the direction indicated by arrow 40 shown in FIGS. 1 and 3 using stepper motor 22, gears 24 and belt 26.

FIG. 3 also shows another aspect of the present invention which relates to the use of electronic circuitry carried on card 90. Such circuitry is known in the industry as "smart card circuitry," "card memory," "card processor," or "stored value circuitry." In general, this technology may be used to store additional information on identification card 90, beyond what is stored on magnetic strip 92 or as text or picture information 94, 96. Such encoding circuitry is available from a number of companies including, for example, UbiQ at 7732 West 78th Street, Bloomington, Minn. 55439. In FIG. 3, identification card printer 10 includes electrical coupling 111 which includes a plurality of electrical contacts (typically 6 to 8) positioned for coupling to electrical contacts carried on card 90. Electrical coupling 111 connects to controller 14 or, in another embodiment, connects to a data port (not shown) on the base 12 of printer 10 whereby external programming circuitry may be used to program or store information in the electrical circuitry carried on identification card 90. Optionally, controller 14 may be used to perform the programming operation using electrical coupling 111. The surface onto which information 94 and 96 is printed is preferably substantially flat and such electrical circuitry carried in card 90 should not alter this profile. Various types of electrical connectors 111 are considered to be within the scope of the invention and the particular connection is shown as one preferred embodiment. In the embodiment shown, the electrical connectors of coupling 111 are pressed against contacts in card 90 as card 90 is inserted by an operator in region 112. In another embodiment, the electrical coupling 111 may be attached to base 12 whereby card 90 is moved into position for the step of electrical programming. Generally, information carried on magnetic strip 92, printed information 94 and 96, and information programmed using electrical coupling 111 are in some way related to one another and, perhaps, the bearer of the identification card 90. Other types of data may also be encoded onto card 90, for example, in an optical format.

In operation a host computer (not shown), for example, sends information via a data communication line 120 to ink jet identification card printer 10 using input/output port 56. This information is received by controller circuitry 14. In one embodiment, the information received by controller 14 includes magnetically encoded information for encoding onto magnetic strip 92 along with text and picture information 94 and 96 for printing onto card 90. In one preferred embodiment, the magnetic information is first encoded onto card 90. Card 90 is placed in identification card holding region 112 by an operator. Controller 14 formats the information for magnetic recording. The operator presses a button 50 to activate the magnetic recording process which causes controller 14 to energize stepper motor 22 and thereby move tray 20 in a direction inward, along arrow 40, into the base 12 of printer 10. A sensor 122 shown in FIG. 1 detects the end of tray 20 which, after an optional time delay, causes controller 14 to begin to magnetically encode information onto magnetic strip 92 using magnetic head 32.

Figure 4:
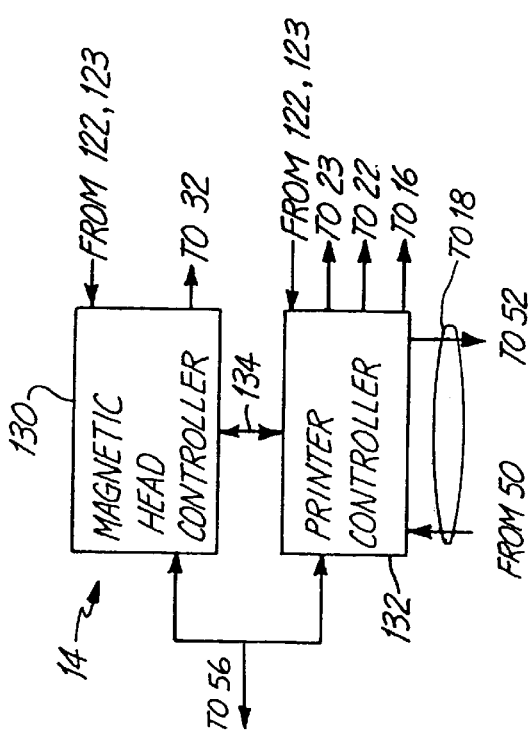
FIG. 4 is a simplified block diagram showing control circuitry used in the ink jet identification card printer of FIG. 1 which includes a magnetic head controller and a printer controller.

FIG. 4 shows a simplified block diagram of controller 14 which generally includes magnetic head controller 130 and printer controller 132. Controllers 130 and 132 couple to input/output port 56 and are interconnected by databus 134. Magnetic head controller 130 couples to front card sensor 122 and back card sensor 123 and provides a data signal to magnetic head 32. Printer controller 132 also couples to front card sensor 122 and back card sensor 123 and further couples to stepper motors 22 and 23 and provides data to print head 16. Sensors 122 and 123 are preferably optical sensor which provide a logic level output if the light received by the sensor exceeds a predetermined threshold. Preferably, sensors 122 and 123 also include a source of radiation which is directed toward the path of card 90. Printer controller 132 also provides an interface to control panel 18 for operation of LED's 52 and receipt of signals from buttons 50. LED's 52 are used during the printing operation to provide status information to an operator such as, for example, an error condition. Buttons 50 are used by an operator to control operation of printer 10, for example, tray eject, printer reset, etc.

During operation, magnetic head controller 130 provides the data signal to magnetic head 32 for writing onto magnetic strip 94. In one embodiment, the time delay between the triggering of the front card sensor 122 and the magnetic recording may be adjusted, for example, by adjusting an offset potentiometer (not shown) which is coupled to controller 130 and controls an analog voltage input to magnetic head controller 130. This analog voltage input is converted to a digital value which is used by controller 130 in generating the time delay. This adjustment may be provided to account for variations between different printing mechanisms, configurations, etc. Stepper motor 22 is actuated by controller 130 whereby magnetic strip 92 is drawn past magnetic head 32. After a time delay, the printer controller 132 inhibits the signal to stepper motor 22 and stop the magnetic recording operation. At this point the tray 20 is ejected and the magnetic data recorded is verified (as described below). After verification, the LED 50 flashes to indicate to the user to move the card 90 from 112 to 110 and then press button 52 to start printing.

When controller 130 is informed that the tray is fully in by back card sensor 123, the front card sensor 122 is polled to determine if the magnetic card 90 is positioned in the holding region 110. If card 90 is in holding region 112, and therefore is not present in holding region 110, controller 130 actuates stepper motor 22 to eject tray 20. A verification mode is entered when back sensor 123 provides a signal to controller 130 which indicates that tray 20 is moving in an outward direction as indicated by arrow 40. The verification process is a self-timing process in which magnetic head 32 is used to read back the information which was previously recorded onto magnetic strip 92. The read back signal is received by controller 130 and compared against the written signal to ensure that there are no errors. If the magnetic verification process is successful, the printing process may be entered as described below. If, on the other hand, the magnetic verification process is unsuccessful, an error is reported by flashing an error signal on an LED 52 on printer 10 and/or by sending a signal from I/O port 56 to the host computer. In one preferred embodiment, if the operator attempts to ignore the error and proceed with the printing operation, controller 130 will inhibit the further operation of printer controller 132 by inhibiting the signal from front sensor 122. This will cause controller 132 to immediately eject tray 20. To clear the errors, the operator replaces card 90 in holding region 112 and activates a button 50 on printer 10 which reinitializes the recording and verification process. The error is cleared when the verification process is successfully completed.

After the magnetic recording verification process is complete, the tray 20 is moved in an outward position as shown in FIG. 3, for example, by controller 14 activating stepper motor 22. The operator places card 90 into holding region 110 and, if desired, flips the card. Locking mechanism 114 will be activated to secure card 90 in holding region 110. A button 50 is activated by the operator which initiates the printing operation by printer controller 132. Tray 20 is moved inward along the direction indicated by arrow 40 using stepper motor 22. After being drawn completely into base 12, controller 132 ejects tray 20 using stepper motor 22. As card 90 moves past print head 16, head 16 is controlled by controller 132 to begin the ink jet printing operation. Controller 132 controls motor 23 to move print head 16 in a direction perpendicular to the direction shown by arrow 40 and generally in the plane of card 90 and across the surface of card 90. Individual dots of ink are deposited using an ink jet printing technique to thereby form, for example, information 94 and 96. The ink jet printing is with an aqueous ink jet printing ink. Following the printing operation, controller 14 fully ejects tray 20 using stepper motor 22 whereby the operator may remove card 90 from holding region 110.

Figure 5:
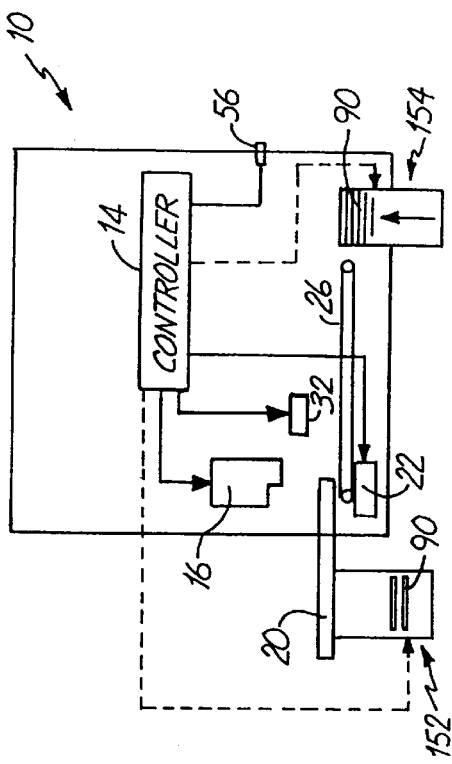
FIG. 5 is a simplified block diagram of an ink jet identification card printer in accordance with another embodiment which includes an input identification card hopper and an output identification card hopper whereby a plurality of identification cards may be sequentially, automatically, processed.

FIG. 5 is a simplified block diagram of a printer 10 in accordance with another embodiment. For simplicity, similar elements have retained their numbers. Printer 10 includes ink jet print head 16, and tray 20 which operably couples to an input hopper 154 and an output hopper 152. Tray 20 moves identification cards 90 past ink jet print head 16 and magnetic recording head 32 in response to actuation by stepper motor 22 as described above. Controller 14 may optionally be coupled to input hopper 154 and output hopper 152 to monitor the status and control operation of the hoppers. During operation, a plurality of cards 90 may be sequentially supplied from input hopper 154 for printing and recording as described above, for example, and subsequently moved to output hopper 152 by tray 20. This allows for automatic printing of a large number of identification cards 90 with reduced operator interaction during the printing process. Furthermore, if controlled by a computer, printer 10 is capable of printing a large number of identification cards 90 automatically where identification card data is retrieved from a database stored in the computer, for example.

In the present invention, prior to printing operation, an ink jet receiving surface is deposited onto a surface of an identification card 90. The ink jet receiving surface is designed to provide good adherence to the identification card surface, receive ink jet ink in a manner which provides a high resolution and high quality image, and preferably reduce or completely eliminate smudging or water solubility of the printed image after the printing process. Furthermore, preferably, the ink jet ink deposited on the print receiving surface dries relatively rapidly, preferably before ejection of the card from the printer, whereby the image is less likely to be smudged or otherwise disturbed.

Figure 6:
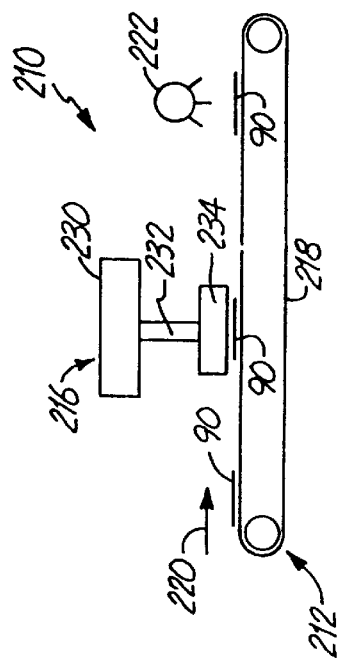
FIG. 6 is a simplified diagram of one method of forming an ink jet receiving surface on an identification card using a screen printing process in accordance with the invention.

FIG. 6 is a simplified view of one process for depositing an ink receiving surface on an identification card 90. The process shown in FIG. 6 is a screen printing process in which the ink receiving surface is screen printed onto a surface of the identification card 90. In one preferred embodiment, the ink receiving surface is on a surface of card 90 which is opposite the magnetic strip 92. In FIG. 6 is a simplified diagram showing a screen printing apparatus 210 in accordance with the invention for depositing an ink receiving surface. Apparatus 210 includes a mechanism 212 for positioning identification cards 90 in a screen printing device 216. In the embodiment shown in FIG. 6, mechanism 212 includes a conveyor belt 218 which moves cards 90 in the direction indicated by arrow 220. Device 216 screen prints with a screen printable ink, such as those set forth herein, onto card 90. In one embodiment, the screen printed ink is cured using an ultraviolet light source 222. Device 216 includes an ink source 230, an actuator mechanism 232 and a screening mechanism 234 which screen prints the ink from ink source 230.

In one preferred embodiment, a formula based on a hydrophilic monomer yields an ink jet printable receiving surface after UV polymerization. The formula is:

acrylic acid-about 80% by weight;

oligomer (a screen print ink component)—about 10% by weight;

silicon dioxide pigment-about 6% by weight; and sensitizer (UV polymerization initiator)—about 4% by weight.

In other embodiments, acrylic acid is replaced with another hydrophilic monomer, such as the ones listed previously. The oligomer (a prepolymerized monomer) is added to increase the screenability of the uncured ink and the durability of the cured ink, with the specific species determined by compatibility with the other components. The pigment type and content is rather arbitrary, and can be adjusted to improve color, opacity, and screenability.

Generally, the ink receiving surface of the present invention includes a hydrophilic polymer and a di-acrylate adapted to absorb an aqueous ink such as the type of ink used in an ink jet printer and to bind to the ink. The coating mixture is coated onto a surface of the substrate and polymerization of the hydrophilic monomer is initialized. The polymerized coating provides an ink receiving surface. The substrate is placed into an ink jet printer and an image is applied to the ink receiving surface using an substantially aqueous ink applied by the ink jet printer.

In another aspect of the present invention, a primer coating is first deposited upon the identification card 90 prior to depositing the ink receiving surface. Such a primer coating preferably adheres to the identification card 90 and exposes a hydrophilic surface for receiving the ink receiving surface. One preferred primer coating is what is known in the art as a "signature panel ink" which is used, for example, to receive ink from a pen and are frequently used on the back of credit cards. One such signature panel ink is 20750 Sp PF Signature White which is available from Sericol, Inc., 1101 West Cambridge Drive, P.O. Box 2914, Kansas City, Kans. This particular primer coating is deposited through silk screening followed by an ultraviolet curing step. With Sp PF Signature White primer coat, ultraviolet radiation at 200 watts/inch was found suitable for coating the surface of identification card 90. The card 90 moved at a speed of 20 feet per minute along a conveyor belt.

Following deposition of the primer coating an ink jet receiving surface is applied to card 90, for example, by screen printing. In one preferred embodiment, this ink receiving surface is formulated as follows for a quart of liquid:

TABLE 1

| Chemical | | | Amount (Normality) | |
|---|---|---|---|---|
| polyvinyl alcohol | powder | | 31.65 g | 0.0020 |
| poly (ethylene imine) | 50% solution | | 44 mL | 0.00072 |
| polyacrylic acid | 25% solution | | 30 mL | 0.00015 |
| aluminum hydroxide | powder | | 379.85 g | 0.0069 |
| water | | | 648 mL | |
| hydrochloric acid | 37% solution | | 16.5 mL | |

The above formulation produces a liquid that is approximately 40% solid which is well suited for screen printing.

The higher molecular weight polyvinyl alcohol improves the water resistance of the coating, but increases the viscosity of the liquid, which therefore requires a more dilute formula. In one preferred embodiment, the molecular weight is between 87,000 and 89,000. However, in another embodiment, the molecular weight of the polyvinyl alcohol may be increased to 120,000. Furthermore, since aluminum hydroxide is alkaline, the hydrochloric acid is added to neutralize the coating. However, a slight acidity is preferred for optimum ink performance. Use of an acidic pigment can eliminate the need for this pH adjustment.

The solution of Table 1 is formed by adding the polyvinyl alcohol and the poly(ethylene imine) to water. This is heated to a sufficient temperature for a sufficient duration to dissolve the polyvinyl alcohol. After the solution, the liquid is allowed to cool to ambient temperature. The aluminum hydroxide pigment is added to the liquid and the liquid is vigorously mixed to disperse the pigment. Under continued mixing, the polyacrylic acid is added. Hydrochloric acid is then added to lower the pH to less than 7.

As used herein, the term "identification card loader" is intended to mean any type of identification card loader and is not limited to the particular tray loading mechanism or hopper set forth herein. For example, various types of identification card loaders include a belt mechanism or a roller mechanism for moving an identification card through the printer. Such mechanisms may provide for additional speed during the printing process and may be particularly useful when used in combination with input and output hoppers. Further, "ink jet ink receiving surface" is intended to include any type of surface adapted to receive aqueous ink from an ink jet printer and provide better absorption characteristics and reduce smudging.

The particular description set forth herein refers to preferred embodiment, however, variations on these preferred embodiments are considered within the scope of the invention. For example, various types of ink jet printing configurations may be used such as an ink jet printer in which the ink jet print head is held stationary while the identification card is moved thereto. Further, the card could be moved rotationally relative to the ink jet print head. In general, the printing may be achieved through any combination of moving the identification card or moving the print head. Further, multiple print heads may be used to increase speed, color definition or resolution. A sufficient number of ink jet print heads would allow the identification card to be moved directly through the printing region and would not require any perpendicular movement of the print heads. A subsequent lamination step may be provided to enhance security and further improve water resistance. The additional functions may be included in the printer such as embossing surfaces of the identification card, punching holes in the identification card, etc. As used herein, one preferred identification card is known in the industry as a CR80 and generally has dimensions of 3⅜ inches long, 2⅛ inches wide and 0.030 inches thick, however the present invention is not limited to this particular type of identification card.

Although the present invention has been described with reference to preferred embodiments, workers skilled in the art will recognize that changes may be made in form and detail without departing from the spirit and scope of the invention. For example, various types of ink jet ink may be used. An ink jet ink which is capable of directly adhering to the identification card without the need of a ink jet receiving surface deposited therebetween while maintaining the qualities necessary for passage through an ink jet print head may be employed.

What is claimed is:

1. A method of printing an identification card, comprising:
   obtaining the identification card substrate which includes a surface;
   preparing a coating mixture;
   coating the surface of the identification card with the coating mixture to form an ink jet receiving surface;
   placing the identification card into a card movement mechanism driven by a stepper motor in an ink jet printer; and
   applying an image to the ink jet receiving surface of the identification card using an acqueous ink jet ink applied by the ink jet printer.

2. The method of claim 1 including magnetically encoding information onto a magnetic strip carried on the identification card while the identification card is in the ink jet printer.

3. The method of claim 2 including reading back information written onto the magnetic strip to verify the accuracy of the information.

4. The method of claim 1 including moving the card movement mechanism through the printer in a first direction.

5. The method of claim 4 wherein the step of applying an image comprises moving an ink jet print head in a direction perpendicular to the first direction and substantially parallel with the surface of the identification card.

6. The method of claim 1 including sensing position of the card movement mechanism within the ink jet printer.

7. The method of claim 1 wherein the identification card is obtained from a plurality of cards in an input hopper and the identification card is placed in an output hopper after the printing process is complete.

8. The method of claim 1 wherein the step of coating the surface of the identification card comprises screen printing onto the surface.

9. The method of claim 1 including curing the coated surface.

10. The method of claim 9 wherein the step of curing comprises exposing the surface to an ultraviolet light source.

11. The method of claim 1 wherein the coating mixture includes a hydrophilic monomer.

12. The method of claim 11 wherein the hydrophilic monomer comprises acrylic acid.

13. The method of claim 1 wherein the step of preparing includes mixing an oligomer to increase the screen printability of the mixture.

14. The method of claim 1 wherein the step of preparing a mixture includes mixing a hydrophilic polymer and a dye-acrylate.

15. The method of claim 1 including applying a primer coating prior to the step of coating the surface.

16. The method of claim 15 wherein the primer coating provides a hydrophilic surface.

17. The method of claim 15 wherein the primer coating comprises signature panel ink.

18. The method of claim 15 wherein preparing a coating mixture includes mixing polyvinyl alcohol.

19. The method of claim 1 including applying a subsequent lamination.

20. The method of claim 1 including embossing the surface of the identification card.

21. An apparatus for printing an identification card substrate, comprising:
    an identification card loader driven by a stepper motor including a substantially flat portion for holding the identification card substrate therein and for moving the identification card in a card direction through an ink jet printer body along a predetermined path;
    an ink jet print head positioned along the predetermined path to deposit an ink jet ink onto a surface of the identification card, the ink jet print head moving in a direction which has a component perpendicular to the card direction whereby movement of the card and movement of the print head will allow the print head to cover substantially the entire surface of the card; and
    a controller in the ink jet printer body coupled to the identification card loader and the ink jet print head for controlling movement of the identification card along the predetermined path and controlling operation of the ink jet print head as the identification card moves therepasts.

22. The apparatus of claim 21 including a magnetic recording head coupled to the controller for magnetically recording information onto a magnetic strip carried on the identification card while the card moves along the predetermined path.

23. The apparatus of claim 22 wherein the controlled reads back information written by the magnetic recording head to verify accuracy of the information.

24. The apparatus of claim 21 wherein the identification card loader comprises a card movement mechanism having a holding region formed therein adapted to hold the identification card in the card movement mechanism during ink jet printing while the card movement mechanism moves along the predetermined path.

25. The apparatus of claim 24 wherein the card movement mechanism includes a clip for holding the identification card in the holding region.

26. The apparatus of claim 25 including at least two clips for placement at opposed corners of the identification card.

27. The apparatus of claim 21 including sensor to detect position of the card loader within the printer body.

28. The apparatus of claim 21 wherein the identification card includes smart card circuitry and the apparatus includes encoding circuitry for encoding information into the smart card circuitry.

29. The apparatus of claim 28 including a data port adapted for coupling to an external computer.

30. The apparatus of claim 21 including sensor to detect position of the card loader within the printer body.

31. The apparatus of claim 30 wherein the sensor comprises an optical sensor.

32. The apparatus of claim 21 including an optical output providing a visual indicating of an error during the printing process.

33. The apparatus of claim 21 including an input hopper for carrying a plurality of identification cards.

34. The apparatus of claim 21 including an output hopper for holding a plurality of identification cards following the printing process.

* * * * *

UNITED STATES PATENT AND TRADEMARK OFFICE
CERTIFICATE OF CORRECTION

PATENT NO. : 6,241,332 B1
DATED : June 5, 2001
INVENTOR(S) : Robert P. Cummins et al.

It is certified that error appears in the above-identified patent and that said Letters Patent is hereby corrected as shown below:

Title page,
Item [62], Related U.S. Application Data, after May 16, 1997" insert --, U.S. Patent No. 5,980,011 --.

Column 3,
Line 13, change "2010" to -- 1020 --.

Column 10,
Line 21, change "therepasts" to -- therepast --.
Line 27, change "controlled" to -- controller --.
Lines 41 and 42, change to -- The apparatus of claim 26 including at least one gear coupling the stepper motor to the card loader. --.
Line 50, change "loader" to -- holder --.

Signed and Sealed this

Thirtieth Day of April, 2002

Attest:

JAMES E. ROGAN
*Attesting Officer*  *Director of the United States Patent and Trademark Office*